United States Patent [19]
Han et al.

[11] Patent Number: 5,925,423
[45] Date of Patent: Jul. 20, 1999

[54] OPTICAL ALIGNMENT POLYMER, ALIGNMENT LAYER FORMED USING THE SAME AND LIQUID CRYSTAL DISPLAY DEVICE HAVING THE ALIGNMENT LAYER

[75] Inventors: Kwan-young Han, Suwon; Seong-han Yu, Seoul, both of Rep. of Korea

[73] Assignee: Samsung Display Devices Co., Ltd, Suwon, Rep. of Korea

[21] Appl. No.: 09/047,388

[22] Filed: Mar. 25, 1998

[30] Foreign Application Priority Data

Mar. 31, 1997 [KR] Rep. of Korea ........................ 97-11795

[51] Int. Cl.⁶ ................................................... G02F 1/1337
[52] U.S. Cl. ................................. 428/1; 528/353; 349/123
[58] Field of Search ................................. 428/1; 528/353; 349/123, 135

*Primary Examiner*—Alexander Thomas
*Attorney, Agent, or Firm*—Leydig, Voit & Mayer

[57] ABSTRACT

An optical alignment polymer having an optical aligning functional group simultaneously introduced into its main chain and side chain, an alignment layer formed using the optical alignment polymer and a liquid crystal display device having the alignment layer are provided. The optical alignment polymer has excellent alignment performance and stability against heat or impact.

12 Claims, No Drawings

OPTICAL ALIGNMENT POLYMER, ALIGNMENT LAYER FORMED USING THE SAME AND LIQUID CRYSTAL DISPLAY DEVICE HAVING THE ALIGNMENT LAYER

BACKGROUND OF THE INVENTION

1. Field of the Invention

The present invention relates to an optical alignment polymer, an alignment layer using the same, and a liquid crystal display device having the alignment layer, and more particularly, to an optical alignment polymer having excellent optical alignment performance and stability against heat or impact, an alignment layer formed using the optical alignment polymer and a liquid crystal display device having the alignment layer.

2. The Related Art

In general, a liquid crystal display device has upper and lower substrate, transparent electrodes and alignment layers formed on the upper and lower substrates and a liquid crystal layer between the upper and lower alignment layers.

In the LCD having the aforementioned structure, according to an externally applied voltage, the arrangement of liquid crystals is changed by the electric field. According to the changed arrangement, external light introduced to the LCD is shielded or transmitted. The LCD is driven by such a property. In other words, if a voltage is applied to the transparent electrode layers, an electric field is formed in the liquid crystal layer. Thus, liquid crystals are driven in a predetermined direction. The light introduced into the liquid crystals of the LCD is shielded or transmitted according to the driving of the liquid crystals.

The functions of the LCD as a display device, i.e., light transmittance, response time, view angle or contrast, are determined by the arrangement characteristic of the liquid crystal molecules. Therefore, controlling the alignment of the liquid crystal molecules uniformly is a very important factor.

The uniform alignment state of the liquid crystals is difficult to accomplish by merely interposing the liquid crystals between the upper and lower substrates. Thus, it is generally known to form the alignment layers for aligning liquid crystals on the transparent electrode layers.

The alignment layer is conventionally formed by a rubbing method in which a thin film made of an organic polymer material such as polyimide or polyamide is formed, cured and then rubbed with a special cloth.

The rubbing method is easy to conduct and the process thereof is simple. However, minute particles or materials such as cellulose may separate from the cloth used in the rubbing treatment and contaminate the alignment layer. Further, depending on the material for forming the alignment layer, the alignment may not be accomplished smoothly. A thin film transistor may be damaged by static electricity generated during the rubbing treatment.

To solve the above-described problems, an optical alignment technology has been developed in which dust, static electricity or other pollutant particles are not generated and cleanliness is maintained during the overall process. According to such a non-destructive alignment method, polarized light is irradiated onto the optical alignment layer to cause anisotropic photopolymerization. As a result, the optical alignment layer has alignment characteristic, thereby uniformly aligning the liquid crystals. The polymer for the optical alignment layer includes polyvinylcinnamate (PVCN) and polyvinylmethoxyxinnamate (PVMC). These polymer compounds have an optically aligning functional group introduced into either a main chain or a side chain thereof.

If the alignment layer is formed using the optical alignment composition having such a polymer, the alignment performance by light and thermal stability becomes poor, and a pretilt angle of a liquid crystal of liquid crystal display device having the alignment layer decreases to almost 0° C.

SUMMARY OF THE INVENTION

To solve the above problems, it is a first object of the present invention to provide an optical alignment polymer having high stability against heat or impact and good pretilt angle characteristics, by simultaneously introducing optically aligning functional groups into its main and side chains.

It is a second object of the present invention to provide an alignment layer formed using the optical alignment polymer.

It is a third object of the present invention to provide a liquid crystal display device having the alignment layer.

To accomplish the first object of the present invention, there is provide a polyimide represented by the following formula (1):

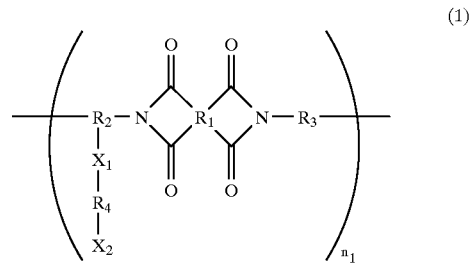

where $R_1$ is a benzophenone component represented by the following formula:

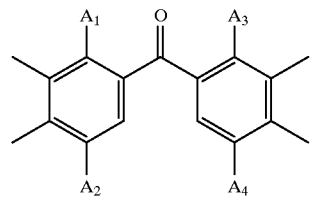

$R_4$ is a benzophenone component represented by the following formula:

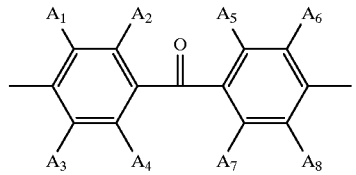

where $A_1$, $A_2$, $A_3$, $A_4$, $A_5$, $A_6$, $A_7$, and $A_8$, are each independently selected from the group consisting of hydrogen, $C_1$–$C_{10}$ alkyl, aromatic, unsubstituted or substituted amino, halide, a halogen atom, hydroxy (OH), nitro ($NO_2$), cyano (CN), thiocyano (SCN), thiol (SH) and carboxyl (COOH) groups;

$R_2$ is selected from the group consisting of unsubstituted or substituted $C_6$–$C_{30}$ aromatic hydrocarbon group with at least one substituent (X), unsubstituted or substituted $C_3-C_{20}$ aliphatic hydrocarbon group with at least one substituent (X);

$X_1$ is COO— or COOCO—;

$R_3$ is E—$CH_2$—F (Here, E is $(CH_2)_m$, where m is an integer from 1 to 10, and F is selected from the group consisting of an unsubstituted or substituted $C_6-C_{30}$ aromatic hydrocarbon group with at least one substituincreasing the functional points for anchoring liquid crystals on an optical alignment polymer having an optically aligning functional group simultaneously introduced into its main chain and side chain.

As the polyimide, a compound represented by the following formula (2) is preferably used:

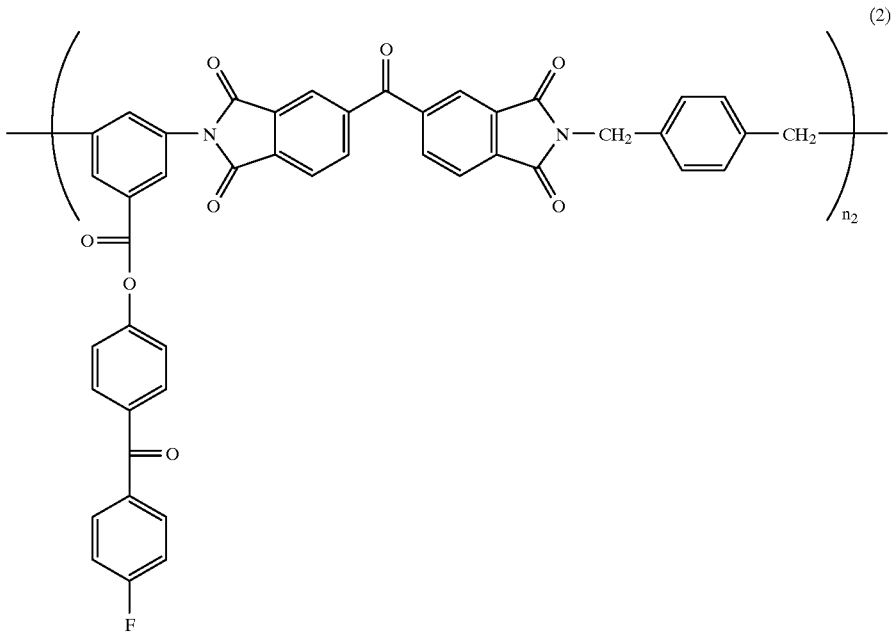

ent (X), and an unsubstituted or substituted $C_3-C_{20}$ aliphatic hydrocarbon group with at least one substituent (X);

$X_2$ is selected from the group consisting of hydrogen, halide, a halogen atom, cyano (CN), thiocyano (SCN), unsubstituted or substituted amino, hydroxy (OH), nitro ($NO_2$), and $C_1-C_{10}$ alkyl groups;

the substituent (X) is selected from the group consisting of a $C_1-C_{10}$ alkyl, aromatic, unsubstituted or substituted amino, a halogen atom, halide, hydroxy (OH), nitro ($NO_2$), cyano (CN), thiocyano (SCN), thiol (SH) and carboxyl (COOH) groups; and $n_1$ is an integer from 10 to 50.

The weight-average molecular weight of the polyimide represented by the formula (1) is preferably between $4 \times 10^3$ and $1 \times 10^5$.

The second object of the present invention is achieved by an alignment layer comprising polyimide represented by the above formula (1).

The third object of the present invention is achieved by a liquid crystal display device comprising a pair of upper and lower substrates opposed to each other, transparent electrodes formed on the upper and lower substrates, alignment layers formed on the transparent electrodes and a liquid crystal layer between the alignment layers, wherein the alignment layer comprises a polyimide represented by the above formula (1).

DETAILED DESCRIPTION OF THE INVENTION

In the present invention, the alignment performance and alignment stability against heat or impact are improved, by where $n_2$ is an integer from 10 to 50.

In the polymer represented by the above formula (1), the length of the side chain is preferably about 0.8 to 5 times that of a liquid crystal molecule to be used for a liquid crystal display device having an alignment layer formed using the polymer (1), that is, 16 to 100 Å. Here, if the length of the side chain is less than 0.8 times that of a liquid crystal molecule to be used in an liquid crystal display device employing an alignment layer formed from the polymer (1), it is difficult to achieve a desirable pretilt angle of the liquid crystal. If greater than 5 times that of a liquid crystal molecule, the thermal stability is weakened.

Hereinbelow, the present invention will be described in detail with reference to various embodiments, but the invention is not limited thereto.

SYNTHESIS EXAMPLE 1

1.51 g ($9.91 \times 10^{-3}$ mol) of 3,5-diaminobenzoic acid, 1.4 g ($9.91 \times 10^{-3}$ mol) of 1,3-bis(aminomethyl)cyclohexane and 6.30 g ($19.8 \times 10^{-3}$ mol) of 3,3',4,4'-benzophenonecarboxylic dianhydride were dissolved in 60 ml of NMP.

The reaction mixture was stirred at room temperature for 24 hours. Then, 20 ml of m-cresol was added to the resultant and heated at 180° C. for 2 hours.

When the reaction was completed, the resultant was poured into about 1.5 l of water to be precipitated. The obtained precipitated was filtered and dried.

SYNTHESIS EXAMPLE 2

5.08 g ($5.46 \times 10^{-3}$ mol) of the resultant obtained in Synthesis Example 1, 1.42 g ($6.55 \times 10^{-3}$ mol) of 4-fluoro- 4'-hydroxybenzophenone, 1.35 g ($6.55 \times 10^{-3}$ mol) of 1,3-dicyclohexylcarbodiimide (DCC) and 0.16 g ($1.09 \times 10^{-3}$ mol) of 4-pyrrolidinopyridine were dissolved in 60 ml of NMP.

The resultant was stirred for about 6 hours, and the generated N,N'-dicyclohexyl urea was filtered and separated.

The resultant was poured into excess water to be precipitated. The obtained precipitate was filtered and dried.

EXAMPLE

The mixture obtained by dissolving the polyimide obtained in Synthesis Example 2 in NMP was spin-coated on two glass substrates each having an ITO electrode layer. Subsequently, the obtained resultant material was dried at a temperature of about 140° C. for about 30 minutes and heat-treated at a temperature of about 200° C. for about 2 hours, to thus form an alignment layer.

Then, linear polarized light having a wavelength of about 330 nm was irradiated onto the alignment layer to cause a photo-reaction for about 5 minutes.

An empty cell was manufactured by sealing two glass substrates where the alignment layer was formed using a spacer. The LCD was completed by injecting liquid crystals into the empty cell.

In the LCD manufactured by the above Example, the alignment degree, the thermal stability of the alignment layer and the pretilt angle of a liquid crystal were measured. Here, the alignment degree was observed through a polarizing film. The thermal stability was measured by raising the temperature up to 200~250° C., maintaining the resultant for a predetermined time at that temperature, lowering the temperature to room temperature, and then checking the deformation degree of the alignment layer through a polarizing film. The pretilt angle was measured using a crystal rotation method.

As a result, in the LCD manufactured by the Example, the alignment layer had a thermal stability high enough not to deform the alignment layer even if the temperature was raise to 250° C. Also, the pretilt angle of the liquid crystal was about 40°.

In a liquid crystal display device having the alignment layer formed using an optical alignment polymer according to the present invention, the alignment of liquid crystal molecules becomes thermally stable within the range of 200~250° C., and the pretilt angle of the liquid crystal can be increased to 40°.

What is claimed is:

1. An optical alignment polymer comprising a polyimide represented by the following formula (1):

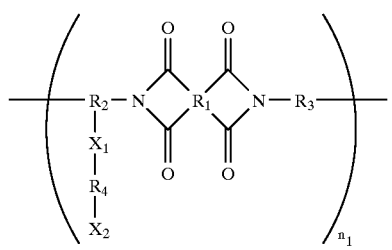

(1)

where $R_1$ is a benzophenone component represented by the following formula:

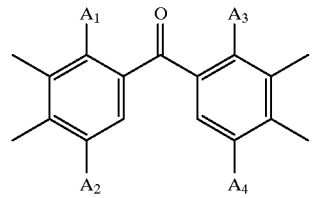

$R_4$ is a benzophenone component represented by the following formula:

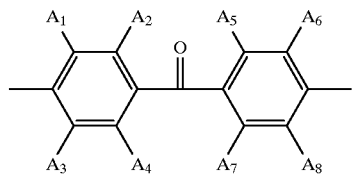

where $A_1$, $A_2$, $A_3$, $A_4$, $A_5$, $A_6$, $A_7$, and $A_8$, are each independently selected from the group consisting of hydrogen, $C_1$–$C_{10}$ alkyl, aromatic, unsubstituted or substituted amino, halide, a halogen atom, hydroxy (OH), nitro ($NO_2$), cyano (CN), thiocyano (SCN), thiol (SH) and carboxyl (COOH) groups;

$R_2$ is selected from the group consisting of unsubstituted or substituted $C_6$–$C_{30}$ aromatic hydrocarbon group with at least one substituent (X), unsubstituted or substituted $C_3$–$C_{20}$ aliphatic hydrocarbon group with at least one substituent (X);

$X_1$ is COO— OR COOCO—;

$R_3$ is E—$CH_2$—F (Here, E is $(CH_2)_m$, where m is an integer from 1 to 10, and F is selected from the group consisting of unsubstituted or substituted $C_6$–$C_{30}$ aromatic hydrocarbon group with at least one substituent (X), and an unsubstituted or substituted $C_3$–$C_{20}$ aliphatic hydrocarbon group with at least one substituent (X));

$X_2$ is selected from the group consisting of hydrogen, halide, a halogen atom, cyano (CN), thiocyano (SCN), unsubstituted or substituted amino, hydroxy (OH), nitro ($NO_2$), and $C_1$–$C_{10}$ alkyl groups;

the substituent (X) is selected from the group consisting of a $C_1$–$C_{10}$ alkyl, aromatic, unsubstituted or substituted amino, a halogen atom, halide, hydroxy (OH), nitro ($NO_2$), cyano (CN), thiocyano (SCN), thiol (SH) and carboxyl (COOH) groups; and $n_1$ is an integer from 10 to 50.

2. The optical alignment polymer according to claim 1, wherein the polyimide is represented by the following formula (2):

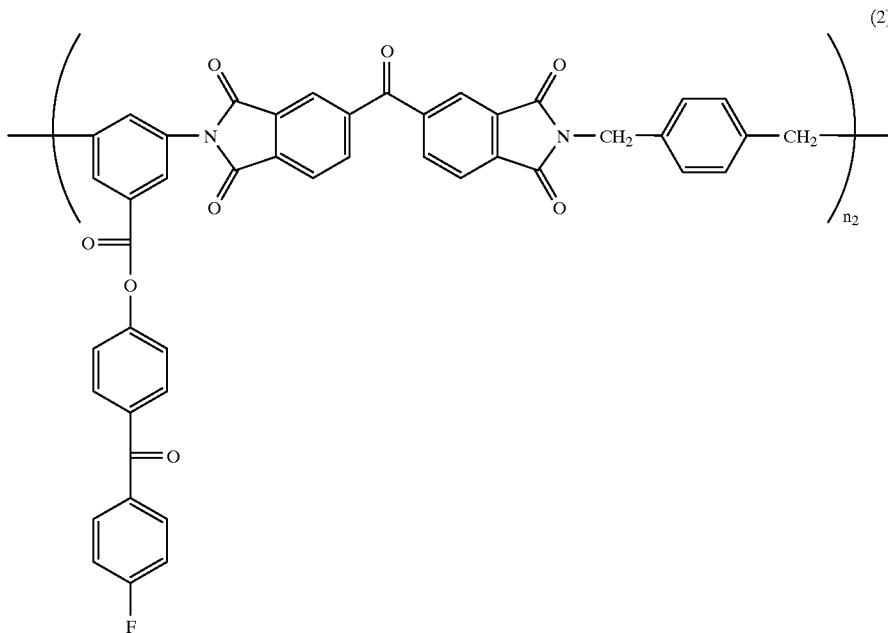

where $n_2$ is an integer from 10 to 50.

3. The optical alignment polymer according to claim 1, wherein the weight-average molecular weight of the polyimide is between $4 \times 10^3$ and $1 \times 10^5$.

4. The optical alignment polymer according to claim 1, wherein in the formula (1), the length of a side chain of the polyimide is 16 to 100 Å.

5. An alignment layer comprising a polyimide represented by the following formula (1):

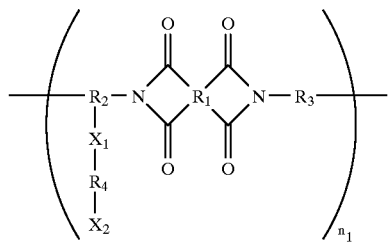

$R_1$ is a benzophenone component represented by the following formula:

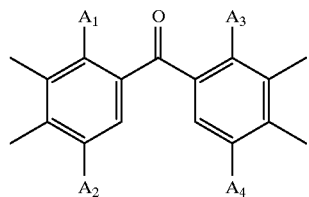

$R_4$ is a benzophenone component represented by the following formula:

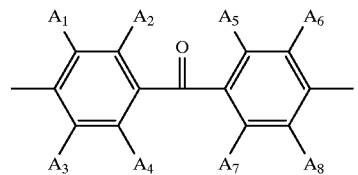

where $A_1$, $A_2$, $A_3$, $A_4$, $A_5$, $A_6$, $A_7$, and $A_8$, are each independently selected from the group consisting of hydrogen, $C_1$–$C_{10}$ alkyl, aromatic, unsubstituted or substituted amino, halide, a halogen atom, hydroxy (OH), nitro ($NO_2$), cyano (CN), thiocyano (SCN), thiol (SH) and carboxyl (COOH) groups;

$R_2$ is selected from the group consisting of unsubstituted or substituted $C_6$–$C_{30}$ aromatic hydrocarbon group with at least one substituent (X), unsubstituted or substituted $C_3$–$C_{20}$ aliphatic hydrocarbon group with at least one substituent (X);

$X_1$ is COO— or COOCO—;

$R_3$ is E—$CH_2$—F (Here, E is $(CH_2)_m$, where m is an integer from 1 to 10, and F is selected from the group consisting of substituted or substituted $C_6$–$C_{30}$ aromatic hydrocarbon group with at least one substituent (X), and an unsubstituted or substituted $C_3$–$C_{20}$ aliphatic hydrocarbon group with at least one substituent X));

$X_2$ is selected from the group consisting of hydrogen, halide, a halogen atom, cyano (CN), thiocyano (SCN), unsubstituted or substituted amino, hydroxy (OH), nitro ($NO_2$), and $C_1$–$C_{10}$ alkyl groups;

the substituent (X) is selected from the group consisting of a $C_1$–$C_{10}$ alkyl, aromatic, unsubstituted or substituted amino, halogen atom, halide, hydroxy (OH), nitro ($NO_2$), cyano (CN), thiocyano (SCN), thiol (SH) and carboxyl (COOH) groups; and $n_1$ is an integer from 10 to 50.

6. The alignment layer according to claim 5, wherein the polyimide is represented by the following formula (2):

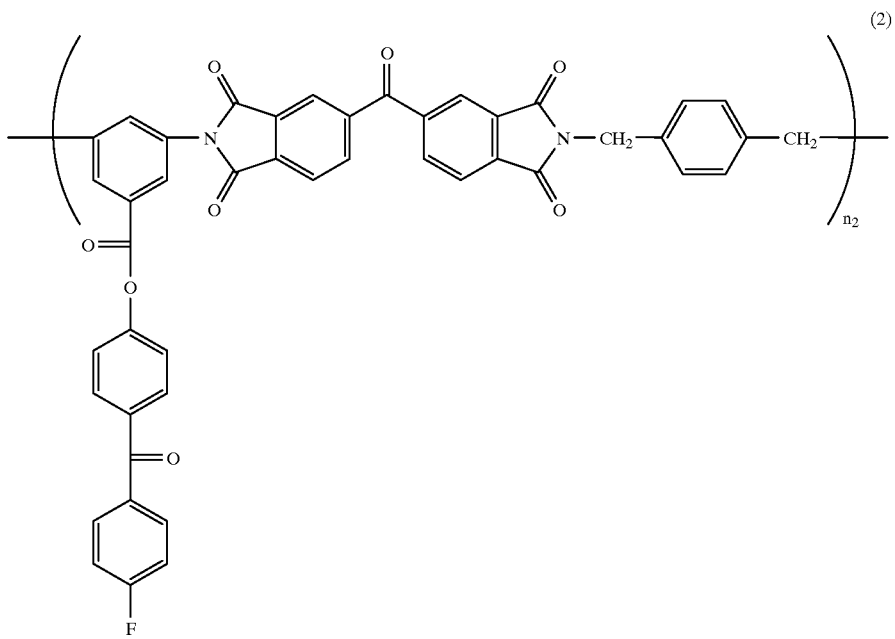

where $n_2$ is an integer from 10 to 50.

7. The alignment layer according to claim 5, wherein the weight-average molecular weight of the polyimide is between $4 \times 10^3$ and $1 \times 10^5$.

8. The alignment layer according to claim 5, wherein in the formula (1), the length of a side chain of the polyimide is 16 to 100 Å.

9. A liquid crystal display device comprising a pair of upper and lower substrates opposed to each other, transparent electrodes formed on the upper and lower substrates, alignment layers formed on the transparent electrodes and a liquid crystal layer between the alignment layers, wherein the alignment layer comprises a polyimide represented by the following formula (1):

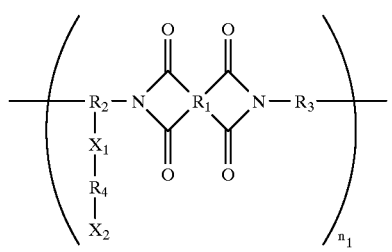

$R_1$ is a benzophenone component represented by the following formula:

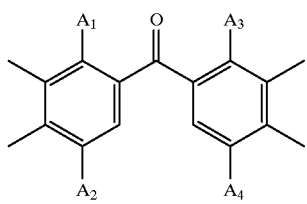

$R_4$ is a benzophenone component represented by the following formula:

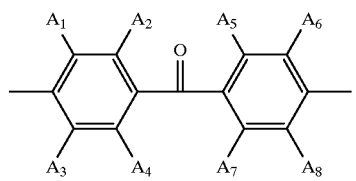

where $A_1$, $A_2$, $A_3$, $A_4$, $A_5$, $A_6$, $A_7$, and $A_8$, are each independently selected from the group consisting of hydrogen, $C_1$–$C_{10}$ alkyl, aromatic, unsubstituted or substituted amino, halide, a halogen atom, hydroxy (OH), nitro ($NO_2$), cyano (CN), thiocyano (SCN), thiol (SH) and carboxyl (COOH) groups:

$R_2$ is selected from the group consisting of unsubstituted or substituted $C_6$–$C_{30}$ aromatic hydrocarbon group with at least one substituent (X), unsubstituted or substituted $C_3$–$C_{20}$ aliphatic hydrocarbon group with at least one substituent (X);

$X_1$ is COO— or COOCO—;

$R_3$ is E—$CH_2$—F (Here, E is $(CH_2)_m$, where m is an integer from 1 to 10, and F is selected from the group consisting of substituted or substituted $C_6$–$C_{30}$ aromatic hydrocarbon group with at least one substituent (X), and an unsubstituted or substituted $C_3$–$C_{20}$ aliphatic hydrocarbon group with at least one substituent (X));

$X_2$ is a selected from the group consisting of hydrogen, halide, a halogen atom, cyano (CN), thiocyano (SCN), unsubstituted or substituted amino, hydroxy (OH), nitro ($NO_2$), and $C_1$–$C_{10}$ alkyl groups;

the substituent (X) is selected from the group consisting of a $C_1$–$C_{10}$ alkyl, aromatic, unsubstituted or substituted amino, halogen atom, halide, hydroxy (OH), nitro ($NO_2$), cyano (CN), thiocyano (SCN), thiol (SH) and carboxyl (COOH) groups; and $n_1$ is an integer from 10 to 50.

10. The liquid crystal display device according to claim 9, wherein the polyimide is represented by the following formula (2):

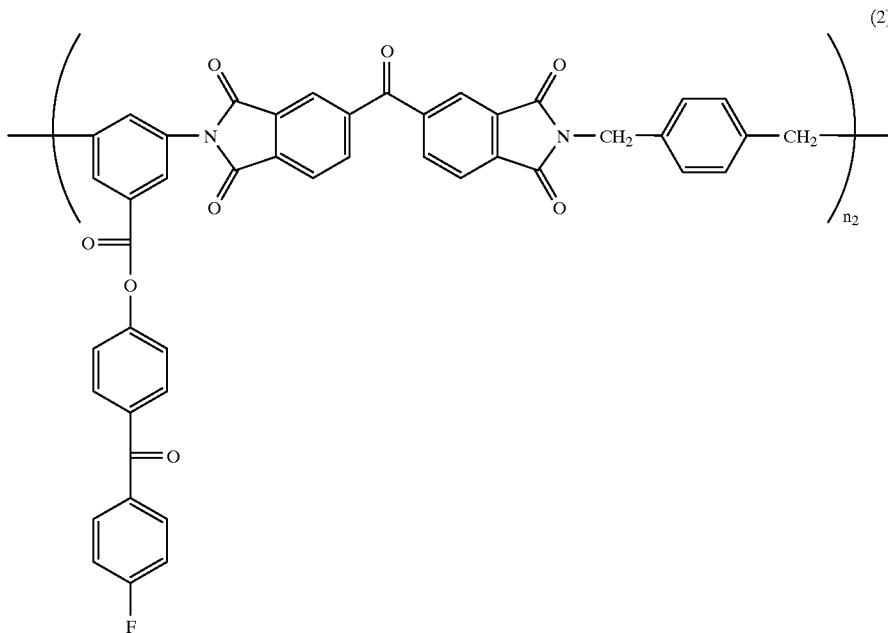
(2)
where n2 is an integer from 10 to 50.
11. The liquid crystal display device according to claim 9, wherein the weight-average molecular weight of the polyimide is between $4\times10^3$ and $1\times10^5$.
12. The liquid crystal display device according to claim 9, wherein the formula (1), the length of a side chain of the polyimide is 16 to 100 Å.
* * * * *